United States Patent [19]

Iwasaki et al.

[11] Patent Number: 4,634,228

[45] Date of Patent: Jan. 6, 1987

[54] FERROELECTRIC LIQUID CRYSTAL CELL WITH RUBBED POLYIMIDE ALIGNMENT LAYER

[75] Inventors: Kishiro Iwasaki, Hitachiohta; Susumu Era; Hisao Yokokura, both of Hitachi; Tadao Nakata, Katsuta; Akio Mukoh, Mito, all of Japan

[73] Assignee: Hitachi, Ltd., Tokyo, Japan

[21] Appl. No.: 729,420

[22] Filed: May 1, 1984

[30] Foreign Application Priority Data

May 1, 1984 [JP] Japan .................................. 59-86235
Jun. 8, 1984 [JP] Japan .................................. 59-116455

[51] Int. Cl.$^4$ .............................................. G02F 1/13
[52] U.S. Cl. .................................. 350/341; 350/350 S
[58] Field of Search ............................. 350/341, 350 S

[56] References Cited

U.S. PATENT DOCUMENTS 4,367,924 1/1983 Clark et al. ......................... 350/334
4,381,886 5/1983 Yokokura et al. .................. 350/341
4,561,726 12/1985 Goodby et al. ..................... 350/341

FOREIGN PATENT DOCUMENTS 0091661 10/1983 European Pat. Off. .
55-10180 3/1980 Japan .

OTHER PUBLICATIONS

Meyer, R. B., et al., "Ferroelectric Liquid Crystals," *Supplement au J. de Physique*, Tome 36, No. 3, Mar. 1975, pp. 69–71.
Clark, N. A., et al., "Submicrosecond Bistable Electrooptic Switching in Liquid Crystals," *Appl. Phys. Lett.*, vol. 36, No. 11, Jun. 1980, pp. 899–901.

*Primary Examiner*—John K. Corbin
*Assistant Examiner*—Richard F. Gallivan
*Attorney, Agent, or Firm*—Antonelli, Terry & Wands

[57] ABSTRACT

Orientation control films are coated on a pair of transparent substrates on the side contiguous to the ferroelectric liquid crystal layer and rubbed for aligning molecules thereof. The films are made of a polyimide polymer prepared by ring closure by heating and dehydrating of a polyamic acid which is synthesized by condensing, for example, pyromellitic dianhydride with 4,4'-diaminoterphenyl. A contrast ratio of the ferroelectric liquid crystal element is improved while keeping a high response characteristic of the ferroelectric liquid crystal materials.

3 Claims, 5 Drawing Figures

FERROELECTRIC LIQUID CRYSTAL CELL WITH RUBBED POLYIMIDE ALIGNMENT LAYER

BACKGROUND OF THE INVENTION

The present relates to an improvement of an orientation control film of a liquid crystal cell employing ferroelectric liquid crystal materials.

Meyer, et al. found that some of the smectic liquid crystals (SmC*, SmH*) exhibited ferroelectricity (cf. J. de Phys., 36, L69 (1975)). Clark, et al. disclosed an application of ferroelectric liquid crystal materials to a liquid crystal display device and reported that these liquid crystal materials showed quick response of 1 ms or below (cf. Appl. Phys. Lett., 36, 899 (1980) and U.S. Pat. No. 4,367,924). From the technical viewpoint, it is most important for these cells to align ferroelectric liquid crystal molecules in a preferred direction substantially parallel to the substrate. According to U.S. Pat. No. 4,367,924, the above-mentioned alignment is obtained by applying a strong magnetic field or a shear stress. However, uniform alignment of liquid crystal molecules is hard to obtain for a cell comprising liquid crystal layers of several μm or below in thickness, even by applying a significantly strong magnetic field. Even if it is possible, the process would not be suitable for mass production. The same is true for the application of a shear stress.

European Patent Application No. 91661 discloses a ferroelectric liquid crystal display device employing a rubbed orientation control film of an organic polymer (PIQ; polyimidoisoindoloquinazolinedione, a product of Hitachi Chemical Co., Ltd.) for achieving uniform alignment. The alignment process thereof comprises converting the ferroelectric liquid crystal into an isotropic phase and, while applying a strong electric field, cooling slowly, so that the process is not preferable for mass production.

SUMMARY OF THE INVENTION

One object of the present invention is to provide a ferroelectric liquid crystal cell with an orientation control film for liquid crystal molecules which is particularly suited for mass production.

Another object of the present invention is to provide a ferroelectric liquid crystal cell with an orientation control film for liquid crystal molecules which exhibits a high contrast ratio while keeping a high (fast) response to an applied electric field, which is inherent to the ferroelectric liquid crystal materials.

The ferroelectric liquid crystal cell of the present invention includes a pair of substrates, a pair of electrodes for generating an electric field, each of which is fitted to a respective substrate, a ferroelectric liquid crystal layer sandwiched and sealed between the pair of substrates and a pair of orientation control films disposed on the respective substrates on the side contiguous to the ferroelectric liquid crystal layer for uniformly aligning the molecules thereof.

The first aspect of the orientation control film of the present invention comprises a polyimide polymer material having repeating units of the general formula

wherein R represents a divalent group selected from among

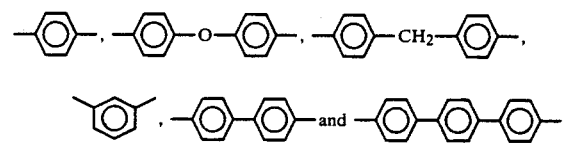

Polyimide polymers are made up with imide bonds. They are generally insoluble in solvents because of the presence of imide bonds. Therefore, it is desirable to coat the substrate with a polyimide polymer by dissolving polyamic acid in a solvent as described below and applying the obtained solution on the substrate in a manner as described below, followed by ring closure by heating and dehydrating to thereby form the imide bonds.

The above polyamic acid, which is a precursor of the polyimide, is synthesized by condensing a tetracarboxylic acid anhydride with a diamine. The condensation is carried out under an absolute condition at a temperature of 50° C. or below.

Preferred tetracarboxylic acid anhydride is 3,3',4,4'-diphenyltetracarboxylic anhydride of the formula:

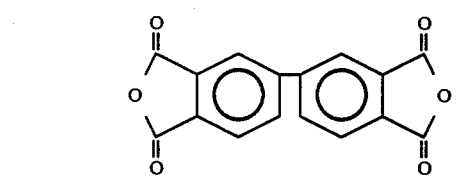

Preferred diamines include

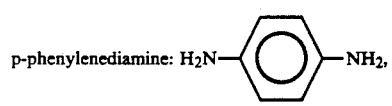

p-phenylenediamine

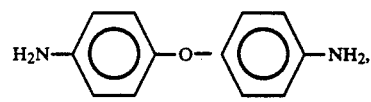

4,4'-diaminodiphenyl ether

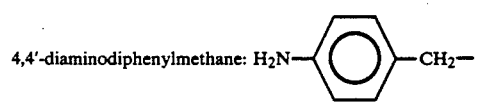

4,4'-diaminodiphenylmethane

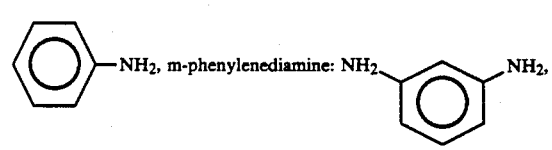

m-phenylenediamine 4,4'-diaminodiphenyl(benzidine):

-continued

and 4,4'-diaminoterphenyl:

Another aspect of the orientation control film of the present invention comprises a polyimide polymer material having repeating units of the general formula:

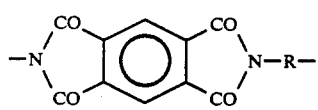 [II]

where R represents a divalent group selected from among

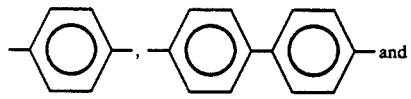

The polyimide polymers of the formula [II] are formed by ring closure through heating and dehydrating of a polyamic acid in a solvent, which polyamic acid is a precursor of the polyimide, in a similar manner with the polyimide polymers of the formula [I].

The above polyamic acid, which is a precursor of the polyimide, is synthesized by condensing a tetracarboxylic acid anhydride with a diamine. The condensation is carried out under an absolute condition at a temperature of 50° C. or below.

A preferred tetracarboxylic acid anhydride is pyromellitic dianhydride of the following formula:

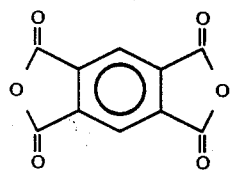

Preferred diamines include p-phenylenediamine; 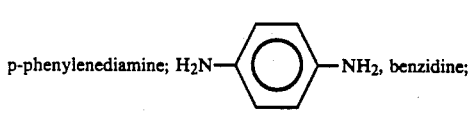 benzidine;

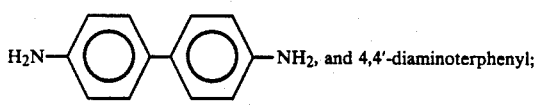 and 4,4'-diaminoterphenyl;

-continued

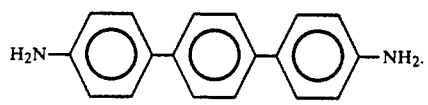

A further aspect of the orientation control film of the present invention comprises a polyimide polymer material having repeating units of the general formula:

$$-N\begin{matrix}CO\\CO\end{matrix}Ar\begin{matrix}CO\\CO\end{matrix}N-R-$$ [III]

where Ar represents a tetravalent group selected from among

, and

R represents a divalent group selected from among

,

,

, and

, where $R_1$–$R_5$ represent lower alkyl groups.

In order to apply the polyamic acid on the substrate, the polyamic acid is dissolved in a solvent such as dimethylformamide, dimethylacetamide, dimethyl sulfoxide or N-methyl-2-pyrrolidone to give a solution of 0.1 to 30% by weight, preferably 1 to 10% by weight, in concentration. The solution thus obtained is then applied on the substrate by an appropriate manner such as brushing, immersing, spinning, spraying or printing to thereby form a film on the substrate. After the application, the substrate is heated to 100° to 450° C., preferably 200° to 350° C., to thereby bring about ring closure by dehydration, thus forming a polyimide polymer coating. Subsequently the coated face of the substrate is rubbed with cloth in one direction to thereby form an orientation control film with an electric insulating property.

Examples of the ferroelectric liquid crystal materials used for the present invention are Schiff base liquid crystals as shown below, and mixtures thereof:

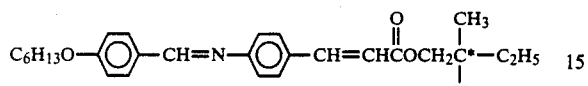

p-hexyloxybenzylidene-p'-amino-2-methylbutyl-cinnamate (OOBAMBC)

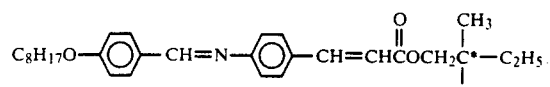

p-octyloxybenzylidene-p-amino-2-methylbutyl-cinnamate (OOBAMBC)

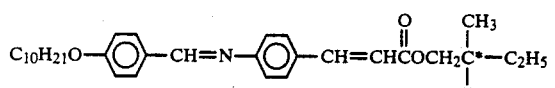

p-decyloxybenzylidene-p'-amino-2-methylbutyl-cinnamate (DOBAMBC)

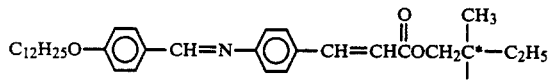

p-dodecyloxybenzylidene-p'-amino-2-methylbutyl-cinnamate (DDOBAMBC)

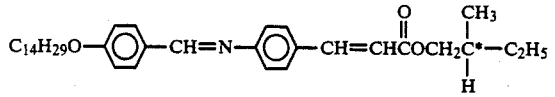

p-tetradecyloxybenzylidene-p'-amino-2-methylbutyl-cinnamate (TDOBAMBC)

Other examples of the ferroelectric liquid crystal materials used for the present invention are as follows, and mixtures thereof:

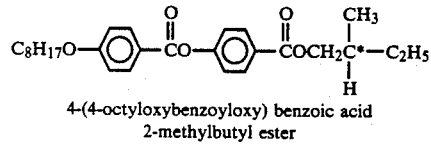

4-(4-octyloxybenzoyloxy) benzoic acid 2-methylbutyl ester

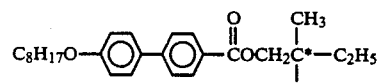

4-(4-octyloxyphenyl) benzoic acid 2-methylbutyl ester

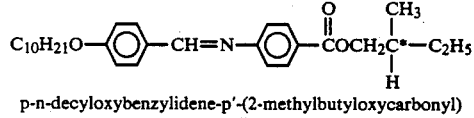

p-n-decyloxybenzylidene-p'-(2-methylbutyloxycarbonyl) aniline

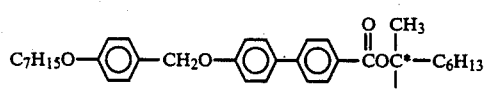

4-(4-heptyloxybenzyloxy)-4'-(1-methylheptyloxycarbonyl) biphenyl

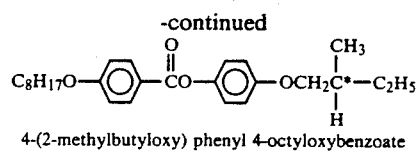

4-(2-methylbutyloxy) phenyl 4-octyloxybenzoate

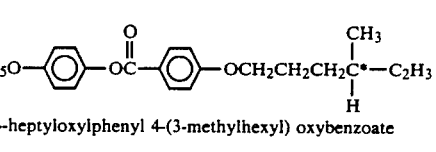

4-heptyloxylphenyl 4-(3-methylhexyl) oxybenzoate

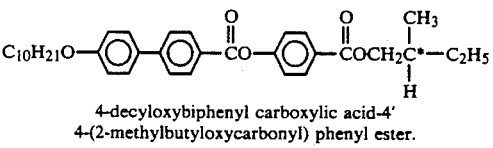

4-decyloxybiphenyl carboxylic acid-4' 4-(2-methylbutyloxycarbonyl) phenyl ester.

The ferroelectric liquid crystal cell as explained below is used for a liquid crystal display device; however, the ferroelectric liquid crystal cell of the present invention can also be used for a liquid crystal optical modulation device, for example.

Further, while the display mode of the following embodiment utilizes the birefringence effect of a liquid crystal material, the display mode utilizing guest-host effect of a liquid crystal material is also applicable to the ferroelectric liquid crystal cell of the present invention.

DETAILED DESCRIPTION OF THE INVENTION

Figure 1:
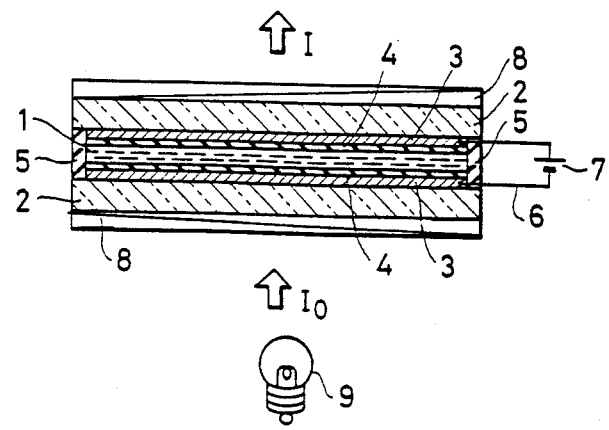
FIG. 1 is a schematic sectional view of one embodiment of the present invention.

FIG. 1 shows a ferroelectric liquid crystal cell of the present invention. That is, FIG. 1 is a sectional side view of one embodiment of a liquid crystal display cell comprising a ferroelectric liquid crystal, wherein 1 represents a ferroelectric liquid crystal, 2 represents glass substrates, 3 represents transparent electrodes, 4 represents orientation control films of polyimide polymer, details of which will be explained below, 5 represents a spacer, 6 represents a lead wire, 7 represents an electric source, 8 represents polarizers, 9 represents a light source, $I_o$ represents an incident beam and I represents a transmitted beam. A transparent electrode 3 called ITO film (a thin film comprising indium oxide and tin oxide) is formed on each glass substrate and insulating orientation control films 4 of the polyimide polymer formed over the transparent electrodes 3 are rubbed with cloth such as gauze to align long molecular axes of the liquid crystal molecules in the rubbing direction. These two glass substrates are disposed at an appropriate distance from each other by inserting a spacer 5 therebetween, and ferroelectric liquid crystal 1 is enclosed therein. The transparent electrodes 3 are connected to an external electric source 7 with a lead wire 6. A polarizer 8 is stuck on the external face of each glass substrate 2. A light source 9 is employed since the cell as shown in FIG. 1 is a transmission type. The incident beam $I_o$ from the light source 9 passes through the liquid crystal cell and the transmitted beam I is recognized by an observer.

FIG. 2 shows the movement of a ferroelectric liquid crystal molecule when electric fields of opposing polarities are applied between the pair of electrodes 3 shown in FIG. 1, wherein 10 represents the liquid crystal molecule, 12 represents the direction of the rubbing for the orientation control film, 81 represents the direction of the polarization axis of the upper polarizer 8, 101 represents the direction of the long molecular axis of the liquid crystal, $\theta$ represents a tilt angle inherent to a ferroelectric liquid crystal material and E represents an electric field applied.

Figures 2A, 2B, 2C:
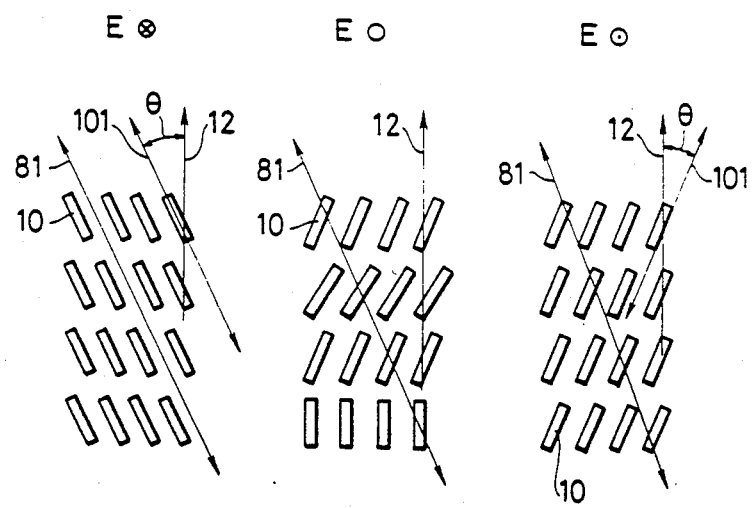
FIGS. 2(A), 2(B), and 2(C) are enlarged schematic diagrams illustrating movement of molecules of the ferroelectric liquid crystal under applications of electric field of opposing polarities, and nonapplication thereof, when viewed from the above of FIG. 1.

When an electric field is applied to the liquid crystals 1 by forming an electric field between the electrodes 3, the liquid crystal molecules are aligned as shown in FIG. 2(A) or FIG. (B), depending on the direction of the electric field. When the liquid crystal molecules are aligned as shown in FIG. 2(A), the direction of the long molecular axis 101 of the liquid crystal molecule 10 coincides with that of the polarization axis 81 of the polarizer 8. On the other hand, when the long molecular axes 101 of the liquid crystal molecules are aligned as shown in FIG. 2(B), the long molecular axis 101 is deviated from the polarization axis 81. Because of the coincidence of the long molecular axis 101 with the polarization axis 81 as shown in FIG. 2(A), an observer would sense the transmitted beam I faint and dark. On the other hand, the long molecular axis 101 is deviated from the polarization axis 81 by angle $2\theta$ as shown in FIG. 2(B), so that an observer would sense the transmitted beam I intense and bright. Thus display is effected by altering the direction of the electric field, in other words, by alternating the applied voltage to the electrodes.

FIG. 2(C) shows the locations of liquid crystal molecules when no electric field is applied. The molecules form lamellas perpendicular to the substrate, which is inherent to smectic liquid crystal materials, and further the molecules are observed to take positions to form helices across the lamellas, the axes of which are oriented in parallel to the rubbing direction 12 of the orientation control film.

EXAMPLE 1

A polyimide polymer coating acting both as an insulating layer and as an orientation control layer was formed in the following manner. 3,3'4,4'-diphenyltetracarboxylic anhydride and p-phenylenediamine were condensed in a molar ratio of 1:1 to give a polyamic acid, which was then diluted to a concentration of 3.5% by weight with N-methyl-2-pyrrolidone. The obtained solution was applied on transparent glass substrates coated with a transparent conductive indium oxide (ITO coating) at one face, such ITO coating to act as an electrode, by spinning at 3500 r.p.m. for 40 sec. After the application, the substrates were heated to 250° C. for one hour to give coatings of approximately 80 nm (800Å) in thickness.

The coated face of each sustrate was rubbed with a cloth and opposed to each other with the directions of rubbing parallel to each other. A glass fiber plate of 10 $\mu$m in thickness was inserted between the two substrates as a spacer to give a liquid crystal cell in which liquid crystal was enclosed in vacuo. The above-mentioned DOBAMBC was employed as the liquid crystal material. After enclosing, the cell was heated to the isotropic liquid crystal phase temperature and then slowly cooled to the chiral smectic C phase temperature at a rate of 0.5° C./min to thereby give a ferroelectric liquid crystal cell.

Figure 3:
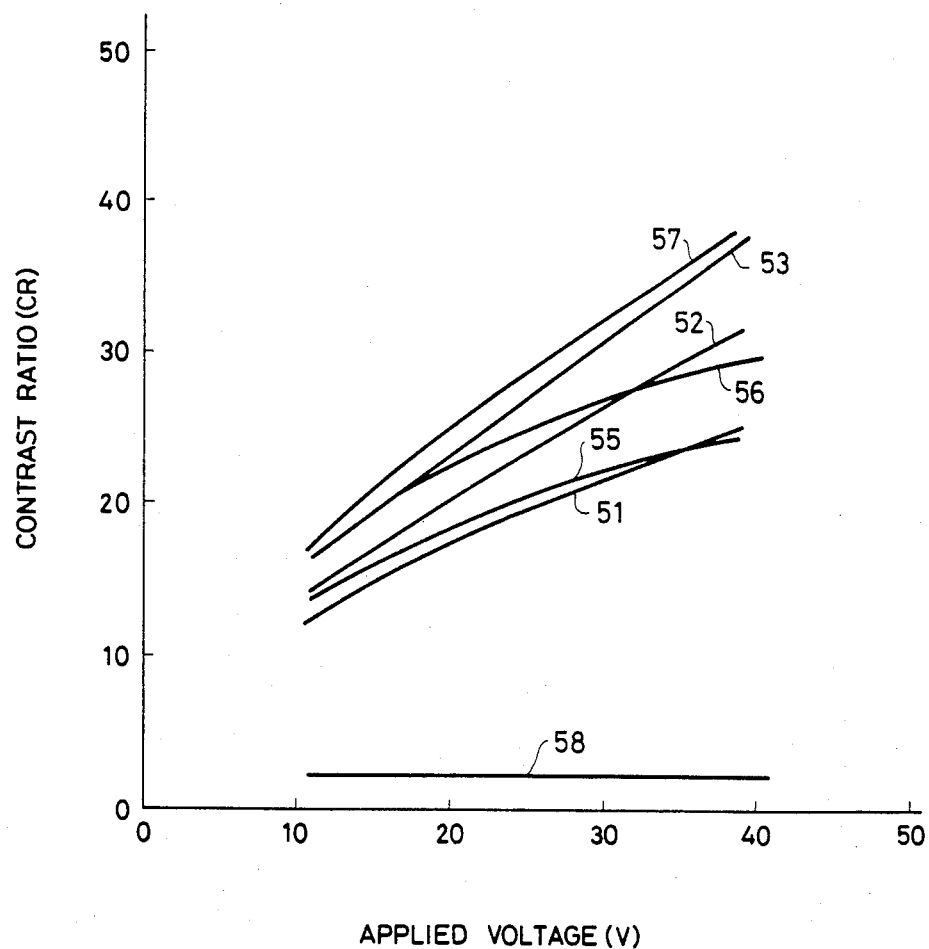
FIG. 3 is a graph showing a relationship between contrast ratio and applied voltage to the electrodes of the ferroelectric liquid crystal cells of Examples of the present invention and a Comparative Example.

Direct current voltages were applied to the electrodes of the thus obtained cell to determine the contrast ratio (CR) between opposing electric fields. The curve 51 in FIG. 3 is the resultant contrast ratio. The contrast ratio under an applied voltage of 20 V was approximately 18. The high contrast suggested that the liquid crystal molecules were uniformly aligned parallel to the direction of rubbing and that the CR increased with an increase in voltage. The dielectric strength of this coating was $4 \times 10^6$ V/cm, which is nearly equal to those of insulating films used in conventional nematic liquid crystals and satisfies a practical requirement. The response time thereof in which the intensity of the transmitted beam decreases to $\frac{1}{2}$ of an intensity difference between the initial and final transmitted beams was approximately 80 $\mu$s at 10 v.

EXAMPLE 2

A polyimide polymer coating acting both as an insulating layer and as an orientation control layer was formed in the following manner. 3,3',4,4'-diphenyltetracarboxylic anhydride and 4,4'-diaminodiphenyl were condensed in a molar ratio of 1:1 to synthesize a polyamic acid, which was then diluted to a concentration of 3.5% by weight by N-methyl-2-pyrrolidone. The obtained solution was treated in the same manner as described in Example 1 to thereby give a ferroelectric liquid crystal cell. The film of this cell was 80 nm in thickness and the dielectric strength thereof was $4 \times 10^6$ V/cm. The resultant CR, determined in the same manner as described in Example 1, is shown as curve 52 in FIG. 3. The CR under an applied voltage of 20 V was approximately 20. The high contrast suggested that the liquid crystal molecules were uniformly aligned parallel to the direction of rubbing and that the CR increased with an increase in voltage. The response time thereof, determined in the same manner as described in Example 1, was approximately 70 $\mu$s.

EXAMPLE 3

A polyimide polymer coating acting both as an insulating layer and as an orientation control layer was formed in the following manner. 3,3',4,4'-diphenyltetracarboxylic anhydride and 4,4'-diaminoterphenyl were condensed in a molar ratio of 1:1 to synthesize a polyamic acid, which was then diluted to a concentration of 3.5% by weight with N-methyl-2-pyrrolidone. The obtained solution was treated in the same manner as described in Example 1 to give a ferroelectric liquid crystal cell. The film of this cell was approximately 70 nm in thickness and the dielectric strength thereof was $4 \times 10^6$ V/cm. The resultant CR, determined in the same manner as described in Example 1, is shown as curve 53 in FIG. 3. The CR under an applied voltage of 20 V was approximately 23. The high contrast suggested that the liquid crystal molecules were uniformly aligned parallel to the direction of rubbing. The response time thereof, determined in the same manner as described in Example 1, was approximately 65 $\mu$s.

EXAMPLE 4

A polyimide polymer coating acting both as an insulating layer and as an orientation control layer was formed in the following manner. 3,3'4,4'-diphenyltetracarboxylic anhydride was condensed with m-phenylenediamine, 4,4'-diaminodiphenyl ether and 4,4'-diaminodiphenylmethane, each in a molar ratio of 1:1, to synthesize three types of polyamic acid. Each polyamic acid was subsequently diluted with N-methyl-2-pyrrolidone to a concentration of 3.5% by weight. The solutions thus obtained were treated in the same manner as described in Example 1 to thereby form three ferroelectric liquid crystal cells.

Thickness of the film, dielectric strength, CR and response time of each cell, determined in the same manner as described in Example 1, were similar to those determined in Example 1, which suggested that the corresponding coating aligned the liquid crystal molecules parallel to the direction of rubbing uniformly and exhibited excellent insulating properties.

EXAMPLE 5

A polyimide polymer coating acting both as an insulating layer and as an alignment control layer was formed in the following manner. Pyromellitic dianhydride and p-phenylenediamine were condensed in a molar ratio of 1:1 to give a polyamic acid, which was then diluted to a concentration of 3.5% by weight with N-methyl-2-pyrrolidone. The obtained solution was applied on transparent glass substrates coated with a transparent conductive indium oxide (ITO coating) at one face by spinning at 3500 r.p.m. for 40 sec. After the application, the substrates were heated to 250° C. for one hour to give a coating of approximately 800Å (80 nm) in thickness.

The coated face of each substrate was rubbed with cloth and opposed to each other, with the directions of rubbing parallel to each other. A glass fiber plate of 10 $\mu$m in thickness was inserted between the two substrates as a spacer to give a liquid crystal cell in which liquid crystal was enclosed in vacuo. The above mentioned DOBAMBC was employed as the liquid crystal material. After enclosing, the cell was heated to the isotropic liquid crystal phase temperature and then slowly cooled to the chiral smectic C phase temperature at a rate of approximately 0.5° C./min. to thereby give a ferroelectric liquid crystal cell.

Direct current voltages were applied to the electrodes of the thus obtained cell to determine the contrast ratio (CR) between opposing electric fields. The resultant CR is shown as curve 55 in FIG. 3. The contrast ratio under an applied voltage of 20 V was approximately 18. The contrast ratio increased with an increase in voltage. As a result it was revealed that liquid crystal molecules were uniformly aligned parallel to the direction of rubbing. The dielectric strength of this coating was $4 \times 16^6$ V/cm. The response time thereof in which the intensity of the transmitted beam decreases to $\frac{1}{2}$ of an intensity difference between the initial and final transmitted beams was approximately 80 $\mu$s at 10 V.

EXAMPLE 6

A polyimide polymer coating acting both as an insulating layer and as an orientation control layer was formed in the following manner. Pyromellitic dianhydride and benzidine were condensed in a molar ratio of 1:1 to synthesize a polyamic acid, which was then diluted to a concentration of 3.5% by weight with N-methyl-2-pyrrolidone. The obtained solution was treated in the same manner as described in Example 1 to thereby give a ferroelectric liquid crystal cell. The film of this cell was approximately 80 nm in thickness and the dielectric strength thereof was $4 \times 10^6$ V/cm. The resultant CR, determined in the same manner as described in Example 1, is shown as curve 56 in FIG. 3. The CR under an applied voltage of 20 V was approximately 23. The CR increased with an increase in voltage. As a result it was revealed that liquid crystal molecules were uniformly aligned parallel to the direction of rubbing. The response time thereof, determined in the same manner as described in Example 1, was approximately 75 $\mu$s.

EXAMPLE 7

A polyimide polymer coating acting both as an insulating layer and as an orientation control layer was formed in the following manner. Pyromellitic dianhydride and 4,4'-diaminoterphenyl were condensed in a molar ratio of 1:1 to synthesize a polyamic acid, which was then diluted to a concentration of 3.5% by weight with N-methyl-2-pyrrolidone. The obtained solution was treated in the same manner as described in Example 1 to give a ferroelectric liquid crystal cell. The film of this cell was approximately 70 nm in thickness and the dielectric strength thereof was $4 \times 10^6$ V/cm. The resultant CR, determined in the same manner as described in Example 1, is shown as curve 57 in FIG. 3. The CR under an applied voltage of 20 V was approximately 25. The CR increased with an increase in voltage. As a result it was revealed that liquid crystal molecules were uniformly aligned parallel to the direction of rubbing. The response time thereof, determined in the same manner as described in Example 1, was approximately 70 $\mu$s.

COMPARATIVE EXAMPLE 1

A polyimide polymer coating acting both as an insulating layer and as an alignment control layer was formed in the following manner. Polyamic acid which was a precursor of polyimidoisoindoloquinazolinedione (PIQ; a product of Hitachi Chemical Co., Ltd.) was diluted to a concentration of 3.5% by weight with N-methyl-2-pyrrolidone. The solution thus obtained was treated in the same manner as described in Example 1 to thereby give a ferroelectric liquid crystal cell. The film of this cell was approximately 80 nm in thickness and the dielectric strength thereof was $4 \times 10^6$ V/cm. The resultant CR, determined in the same manner as described in Example 1, is shown as curve 58 in FIG. 3. The CR was approximately 2 regardless of the applied voltage. As a result it was revealed that the liquid crystal molecules were aligned at random as a whole regardless of the direction of rubbing.

As described above, the present invention provides a ferroelectric liquid crystal cell wherein ferroelectric liquid crystal molecules are uniformly and parallelly aligned by the specific rubbed orientation control film without applying any high electric field during production thereof, thus giving higher contrast ratios, while keeping a higher response characteristic of the ferroelectric liquid crystal material.

While we have shown and described several embodiments in accordance with the present invention, it is understood that the same is not limited thereto but is susceptible of numerous changes and modifications as known to one having ordinary skill in the art and we therefore do not wish to be limited to the details shown and described herein, but intend to cover all such modifications as are encompassed by the scope of the appended claims.

What is claimed is:

1. A ferroelectric liquid crystal cell including a pair of substrates, at least one of which is transparent; a ferroelectric liquid crystal layer sandwiched between said substrates; a pair of electrodes fitted respectively to said substrates for applying an electric field to said ferroelectric liquid crystal layer; and a pair of rubbed orientation control films formed on said respective substrates on the side contiguous to said ferroelectric liquid crystal layer, for uniformly aligning the molecules thereof, wherein said orientation control films are made of a polyimide polymer material selected from the group consisting of a polyimide polymer material having repeating units of the general formula

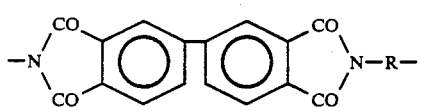  [I]

wherein R is a divalent group selected from the group consisting of

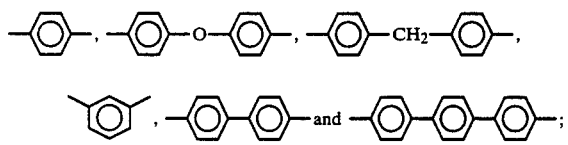

a polyimide polymer material having repeating units of the general formula

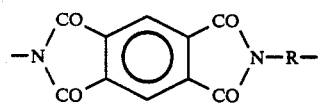  [II]

wherein R is a divalent group selected from the group consisting of

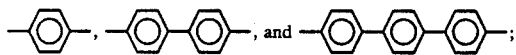

and a polyimide polymer material having repeating units of the general formula

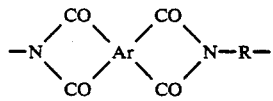  [III]

where Ar is a tetravalent group selected from the group consisting of

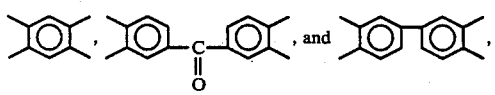

wherein R is a divalent group selected from the group consisting of

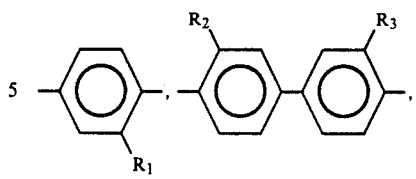

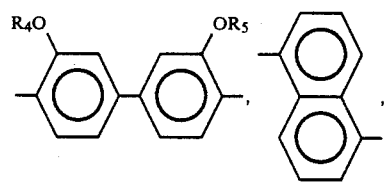

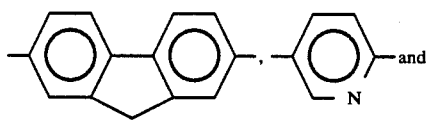

wherein $R_1$–$R_5$ represent lower alkyl groups.

2. A ferroelectric liquid crystal cell according to claim 1, wherein said orientation control film is the polyimide polymer material having repeating units of the general formula [I], prepared by ring closure by heating and dehydrating a polyamic acid which is synthesized by condensing 3,3',4,4'-diphenyltetracarboxylic anhydride with a diamine selected from the group consisting of

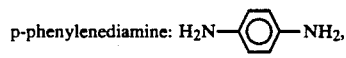

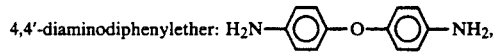

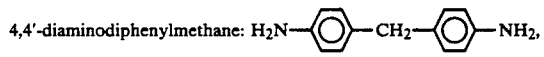

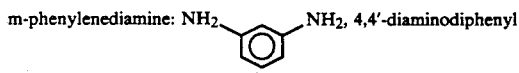

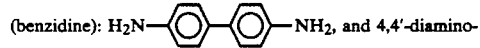

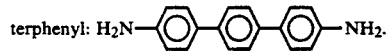

3. Ferroelectric liquid crystal cell according to claim 1, wherein said orientation control film is the polyimide polymer material having repeating units of the general formula [II], prepared by ring closure by heating and dehydrating a polyamic acid which is synthesized by condensing pyromellitic dianhydride with a diamine selected from the group consisting of

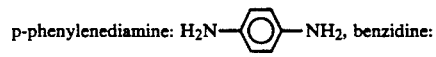

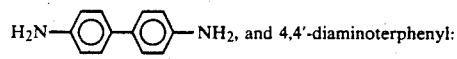, and 4,4'-diaminoterphenyl:
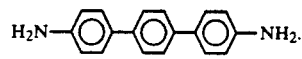
* * * * *